Figure 1:
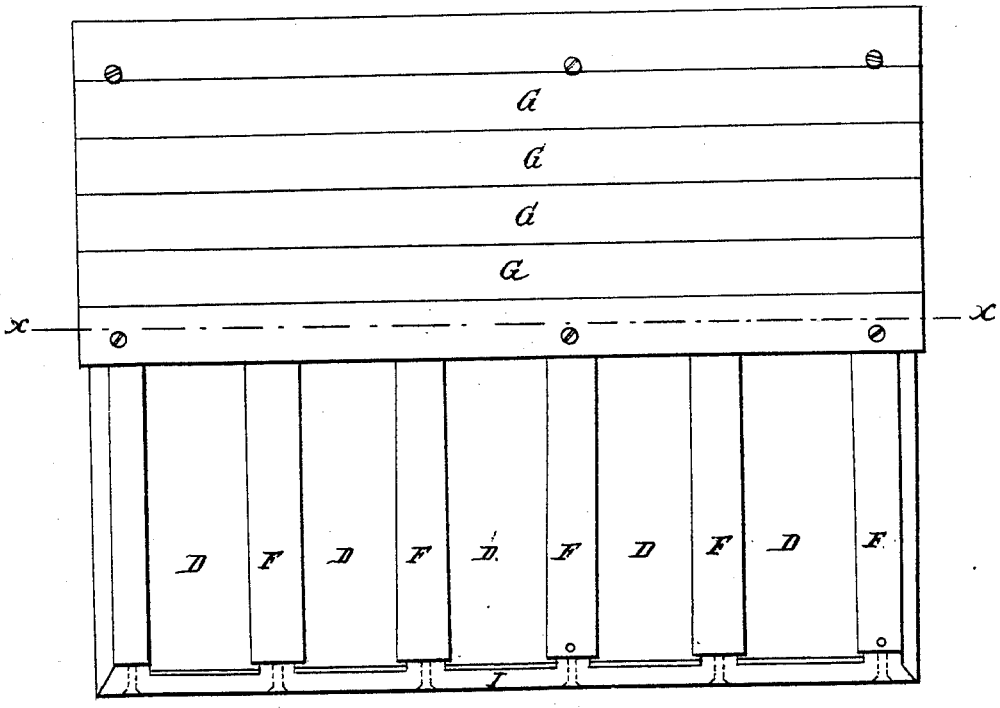
Figure 2:
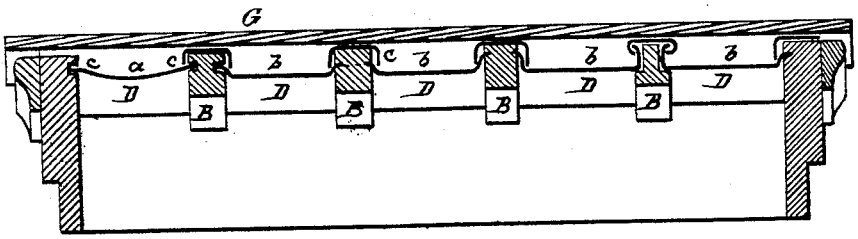
Figure 3:
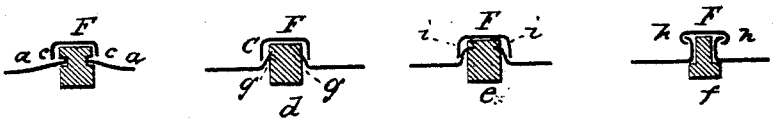

52-22

SEARCH ROOM

A. P. WINSLOW.

Car Roof.

No. 292. A. 1. Patented July 31. 1860.

237

Witnesses:

W. H. Burnap

Henry Fitts

Inventor:

A P Winslow

AM. PHOTO-LITHO. CO. N.Y. (OSBORNE'S PROCESS.)